United States Patent [19]

Bruninga

[11] Patent Number: 4,708,264
[45] Date of Patent: Nov. 24, 1987

[54] WATER TIMER

[75] Inventor: Kenneth J. Bruninga, Mapleton, Ill.

[73] Assignee: L. R. Nelson Corporation, Peoria, Ill.

[21] Appl. No.: 749,903

[22] Filed: Jun. 28, 1985

[51] Int. Cl.[4] ............................................. G01F 11/30
[52] U.S. Cl. .................................. 222/20; 137/624.11; 137/624.18
[58] Field of Search ................... 222/638, 639, 20, 17, 222/14, 18; 137/624.11, 624.12, 624.18, 624.2, 624.14; 251/45; 74/797

[56] References Cited

U.S. PATENT DOCUMENTS

| | | | |
|---|---|---|---|
| 2,305,151 | 12/1942 | Fields | 251/45 X |
| 2,772,067 | 11/1956 | Wilson | 251/45 X |
| 2,863,628 | 12/1958 | Rimsha et al. | 251/45 X |
| 2,929,534 | 3/1960 | Trubert | 222/20 |
| 3,097,762 | 7/1963 | Charnota et al. | 222/20 |
| 3,187,943 | 6/1965 | Wolf | 222/20 |
| 3,473,695 | 10/1969 | Anesi | 222/20 |
| 4,193,522 | 3/1980 | Edelbach | 222/564 X |
| 4,241,759 | 12/1980 | Billeter | 251/45 X |

OTHER PUBLICATIONS

IBM Technical Disclosure Bulletin, vol. 21, No. 9, Feb. 1979, pp. 3452 and 3453.

Primary Examiner—Joseph J. Rolla
Assistant Examiner—David H. Bollinger
Attorney, Agent, or Firm—Cushman, Darby & Cushman

[57] ABSTRACT

A water timer including a housing having an inlet and outlet through which water flows to drive an impeller and speed reducer used to determine the open time of a valve member. The valve member is movable in one direction, corresponding with one direction of axial movement of the timer dial, into a water flow position out of engagement with a valve seat and movable in an opposite direction, corresponding with an opposite direction of axial movement of the dial, into engagement with the valve seat into a water shut-off position. The valve member has a first pressure responsive surface area facing in the opposite direction disposed in communication with water under pressure communicating with the housing inlet and a second pressure responsive surface area facing in the one direction. A controllable water pressure chamber within the timer housing communicates with the second surface area and through a first series of passages with water under pressure communicating with the first surface area when the valve member is in its water shut-off position.

20 Claims, 6 Drawing Figures

WATER TIMER

This invention relates to water timers and more particularly to water timers of the mechanical type which are adapted to communicate a source of water under pressure to a sprinkler or the like and to shut-off the water after a predetermined communication time.

Water timers of the type herein contemplated are well known in the patented literature and in the commerical market place. Typically water timers of the type herein contemplated include a housing structure having a female hose coupling for connecting the housing to the outlet of a conventional sillcock. The housing structure includes a male hose coupling element and a main shut-off valve between the female and male hose couplings. The usual timer also includes a turnable dial for setting the amount of time which the operator desires to communicate a given instrumentality, such as a sprinkler, with the source of water within the sillcock. Inside the housing structure is an impeller which is mounted so that when the valve is open and water is flowing from the inlet through the open shut-off valve and outwardly through the outlet, the impeller will be turned by this flow of water. A valve closing mechanism is connected to the impeller through a gear reduction mechanism so that when the time set by the dial arrives, the valve actuating mechanism will serve to close the main shut-off valve.

U.S. Pat. No. 3,097,762 discloses a water timer in which a relatively simple valve closing mechanism is provided. More specifically, the timer dial in addition to the usual turning movement is also capable of an axial movement and the dial is connected with the main valve so that the axial movement of the dial will effect a similar or corresponding axial movement of the main valve. Thus, the operation is one in which the dial is initially pulled in an axial direction, which pull serves to remove the main valve from its seat or open the same. When the dial is subsequently turned the turning action retains the dial in its pulled axial position and hence the valve in its open position. All that is necesssary is to provide a connection with the dial which will turn it toward its original position as the impeller moves the gear reduction assembly through its required time period. When the dial reaches the end of its time period it moves from its axially pulled position back into its biased position in which the main valve is closed.

The arrangement described above is highly desirable in its simplicity. However, a significant problem is presented in that the main valve is biased by the water pressure into its closed position and there is considerable difficulty in moving it against this bias into its opened position. Moreover, a spring bias must be provided which is added to the hydraulic bias in order to effect the movement of the valve from its open position into its closed position. The spring bias further renders the movement of the valve into its open position more difficult.

In U.S. Pat. No. 2,929,534 there is disclosed a water timer which provides a shut-off valve mechanism within the housing which is mounted, and biased both by the hydraulic setup and by springs to enable the opening and closing movements to be accomplished with relative simplicity. However, the mechanism which interfaces with the valve has a complex and indirect connection with the timer dial which presents a cost effectiveness disadvantage.

Indeed, U.S. Pat. No. 3,473,695 references U.S. Pat. No. 3,097,762 and identifies the shutoff valving problem previously described which is embodied therein. U.S. Pat. No. 3,473,695 solves the problem of simplicity in opening and closing the main valve in much the same way as is accomplished in U.S. Pat. No. 2,929,534 but like the latter the mechanism which is provided between the valve and the timer dial again becomes very complex and indirect.

An object of the present invention is to provide a water timer which will achieve both the advantages of simple and easy shut-off valve actuation as disclosed in U.S. Pat. Nos. 2,929,534 and 3,473,695 without the disadvantages of the indirect and complex mechanism interposed between the valve and the dial as embodied in these patents. Conversely, the water timer of the present invention achieves the advantage of simplicity and lack of complexity in the connection between the shutoff valve and the timer dial as embodied in U.S. Pat. No. 3,097,762 while eliminating the disadvantage thereof relating to a relatively difficult or hard to move shut off valve. Stated more succinctly, it is an object of the present invention to provide a water timer which will achieve all of the individual advantages of the water timers of the prior art without embodying therein any of the individual disadvantages thereof.

In accordance with the principles of the present invention this objective is obtained by providing a water timer including a housing having an inlet and outlet through which water flows to drive an impeller and speed reducer used to determine the open time of a valve member. The valve member is movable in one direction, corresponding with one direction of axial movement of the timer dial, into a water flow position out of engagement with a valve seat and movable in an opposite direction, corresponding with an opposite direction of axial movement of the dial, into engagement with the valve seat into a water shut-off position. The valve member has a first pressure responsive surface area facing in the opposite direction disposed in communication with water under pressure communicating with the housing inlet and a second pressure responsive surface area facing in the one direction. A controllable water pressure chamber within the timer housing communicates with the second surface area and through a first series of passages with water under pressure communicating with the first surface area when the valve member is in its water shut-off position. A biasing arrangement including the relative sizes of the first and second pressure responsive surface areas functions to bias the valve member into its water shut-off position when the dial is in its water shut-off position and a source of water under pressure is communicated with the inlet. A chamber pressure control is operable in response to the axial movement of the dial in the one direction into its water flow position to communicate the chamber with the outlet thereby changing the biasing arrangement to an extent sufficient to cause the same to bias the valve member from its water shut-off to its water flow position.

Another object of the present invention is the provision of a water timer which is simple in construction, effective in operation and economical to manufacture.

These and other objects of the present invention will become more apparent during the course of the following detailed description and appended claims.

The invention may best be understood with reference to the accompanying drawings wherein an illustrative embodiment is shown.

Referring now more particularly to the drawings, there is shown therein a water timer, generally indicated at 10, which embodies the principles of the present invention. The water timer 10 includes, in general, a housing assembly, generally indicated at 12, a female hose coupling 14 adapted to be connected in communicating relation with the outlet of a sillcock for communicating the source of water under pressure therein with the interior of the housing assembly 12. The housing assembly 12 also provides a male hose fitting 16 which constitutes a water flow outlet for the housing assembly. Mounted between the inlet defined by the female hose coupling 14 and the outlet 16 within the housing assembly 12 is a shut-off valve assembly, generally indicated at 18, for controlling the flow of water through the housing assembly 12 between the inlet 14 and outlet 16 thereof.

Mounted within the housing assembly 12 in a position to be turned in response to the flow of water through the housing is an impeller, generally indicated at 20, the output of which is connected with a speed reduction motion transmitting mechanism, generally indicated at 22, which is mounted within and forms a part of the housing assembly 12. The output of the motion transmitting mechanism 22 is connected through a slip clutch assembly, generally indicated at 24, to a timer dial assembly, generally indicated at 26. Finally, valve control structure, generally indicated at 28, is provided for enabling the movement of the dial to control the movement of the valve assembly 18 by a biasing assembly, generally indicated at 30.

The housing assembly 12 includes an outer tubular housing member 32 formed by a peripheral wall which is closed at one end by an end wall 34 and open at its opposite end. An exteriorly flanged inlet opening 36 is formed in the peripheral wall of the outer tubular housing member 32 and the female hose coupling 14 is swivelly connected therewith. At a position adjacent the closed inner end of the housing assembly 12, there is formed integrally with the housing member 32 a central annular wall 38 extending inwardly from the end wall 34 and a plurality of annularly spaced supporting walls or ribs 40 extend between the exterior periphery of the central annular wall 38 and the interior periphery of the adjacent peripheral wall of the outer tubular housing member 32. An outlet opening 42 is formed in the peripheral wall of the outer housing member 32 in a position diametrically opposed from the inlet opening 36 and displaced axially therefrom in a direction away from the end wall 34. This outlet opening 42 leads to the integrally formed male hose coupling 16.

Mounted within the interior of the housing member 32 is a partition structure, generally indicated at 44. The partition structure includes a radially extending annular wall 46 having its exterior periphery sealingly engaged with the interior of the peripheral wall of the outer tubular housing member 32 at a position between the inlet opening 36 and the outlet opening 42. The annular wall 46 is open at its central portion and has an inner annular wall 48 extending axially from the interior periphery thereof which terminates in a annular valve seat 50 facing in a direction toward the end wall 34 of the outer housing member 32. Mounted in surrounding concentric relation with the inner annular wall 48 is an apertured outer annular wall 52 which is integrally connected with the radially extending annular wall 46 and extends axially in generally coextensive relation with the inner wall 48. Formed in the outer wall 52 at annularly spaced positions adjacent the radial wall 46 are a series of openings 54 to allow water from the inlet 36 to pass radially within and axially outwardly of an annular space 56 defined between the exterior periphery of the inner annular wall 48 and the interior periphery of the annular wall 52.

The axially outer exterior periphery of the outer annular wall 52 has fixed thereto the exterior periphery of a flexible diaphragm valve 58 forming a major component of the valve assembly 18. As shown, the periphery of the valve diaphragm 58 is beaded and the bead is clamped by an annular outer skirted portion 60 of a chamber defining member 62 forming a part of the biasing assembly 30. The member 62 includes an outwardly bulged central portion 64 which is adapted to engage within the annular wall 38. The interior of the member 62 defines with the diaphragm valve 58 a control chamber 66.

It will be noted that the diaphragm valve 58 includes a centrally apertured thickened portion 68 which is reinforced by a flanged sleeve 70. The periphery of the thickened portion facing away from the end wall 34 is adapted to engage the annular valve seat 50. The annular portion of the diaphragm between the central thickened portion 68 and the peripheral bead is bulged in a direction toward the end wall. This annular portion defines a pressure surface 72 facing in a direction away from the end wall 34 which communicates with the water entering the inlet 36 and passing through openings 54 into the annular space 56.

Formed in the annular portion of the diaphragm valve 58 defining the surface 72 is a series of annularly spaced restricted orifices 74 which serve to communicate the water contacting the pressure surface 72 with the interior of the chamber 66. It will be noted that the portion of the diaphragm valve 58 extending from the exterior peripheral bead to the central portion thereof provides a second presssure responsive surface 75 which has an area greater than the pressure surface 72. The central portion of the diaphragm valve 58 defines with the interior of the flanged sleeve 70, a passage 76 of a relatively large size compared with the size of the series of restricted orifices 74. Flow of water from the chamber 66 through the central passage 76 is controlled by the control structure 28 which provides a frustoconical surface 78 adapted to engage the end of the passage 76 facing the end wall 34 defined by the central portion of the diaphragm valve 58. The control structure 28 is stepped to receive one end of a coil spring 80 forming a part of the biasing assembly 30. The opposite end of the coil spring 80 is engaged with the bulged center portion 64 of the chamber defining member 62.

Figure 1:
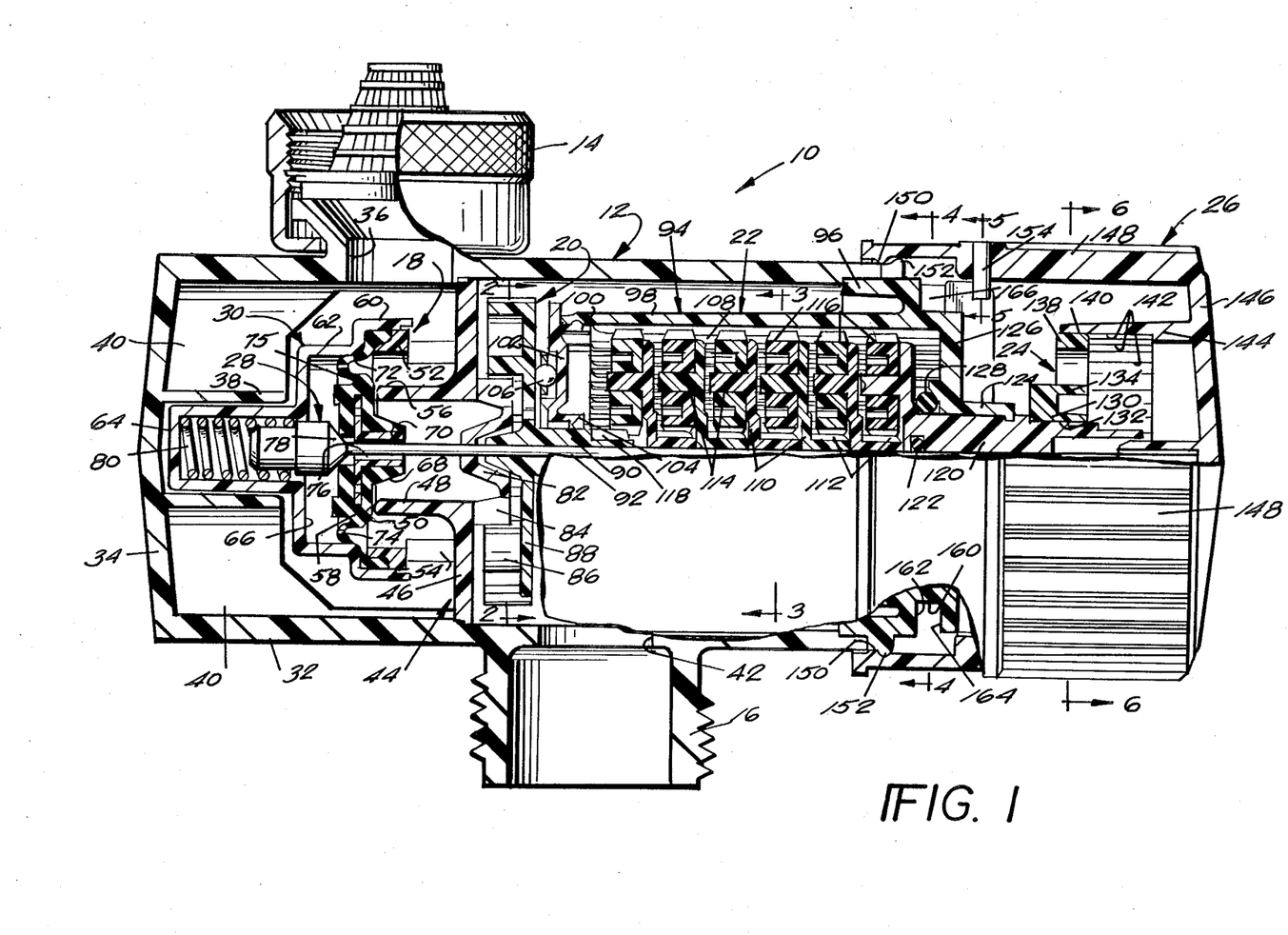
FIG. 1 is a side elevational view of a water timer embodying the principals of the present invention with certain parts broken away for purposes of clearer illustration.

The diaphragm valve 58 is shown in a water shut-off position in FIG. 1 wherein the thickened central portion thereof is disposed in engagement with the annular valve seat 50. The diaphragm valve 58 is formed of sufficiently flexible material that it is capable of moving from its water shut-off position in engagement with the valve seat into a water flow position where the thickened central portion thereof is spaced from the valve seat 50 so as to allow water under pressure from the inlet 36 to flow through the annular space 56 past the valve and into the interior of the annular wall 48.

Figure 2:
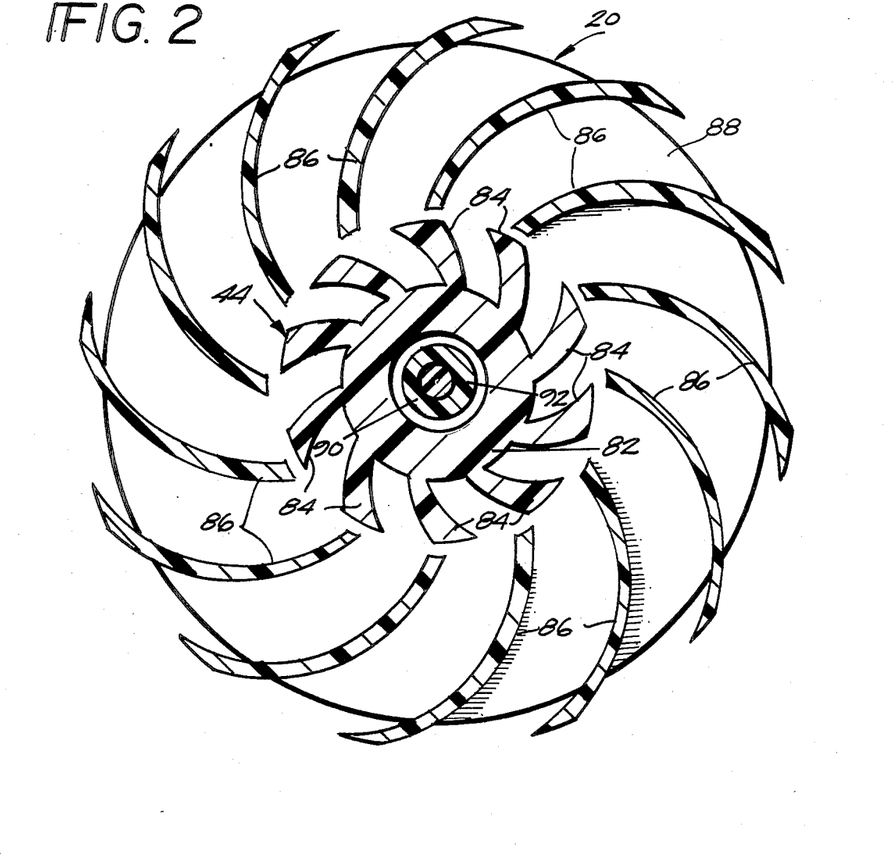
FIG. 2 is an enlarged fragmentary sectional view taken along the line 2—2 of FIG. 1.

The partition structure 44 further includes a frusto-conical end wall 82 which serves to direct the flow of water under pressure passing into the annular wall 48 in a radially outward direction where a series of annularly spaced vanes 84, formed integrally between the annular wall 46 and end wall 82, serve to direct the water onto the blades 86 of the impeller 20. As best shown in FIG. 2, the blades 86 are disposed radially outwardly from the vanes 84 and are fixed together on an annular mounting wall 88 extending radially outwardly from a hub portion 90.

The impeller 20 together with the motion transmitting mechanism 22 form a sub-assembly which is mounted within the peripheral wall of the tubular housing member 32 between the partition structure 44 and the open end thereof. The mounting for this sub-assembly includes a shaft 92 which is fixed to the control member and extends axially through the central opening 76 of the diaphragm valve 58, a central opening in the end wall 82 of the partition structure 44, the hub portion 90 and then outwardly through and beyond the motion transmitting mechanism 22 into engagement with the timer dial assembly 26.

The motion transmitting mechanism 22, which as previously indicated, forms a part of the housing assembly 12, includes a rigid inner housing, generally indicated at 94, consisting of two fixedly interconnected parts, one of which serves as a closure for the open end of the outer tubular housing member 32 and the other of which materially aides in rotatably mounting the impeller 20. As shown, the closure housing part includes an outer mounting wall 96 of generally L-shaped cross-sectional configuration having the stem of the leg formed as an outer peripheral wall portion which is sealingly engaged within an appropriate recess formed on the interior surface of the peripheral wall defining the tubular housing member 32. Extending axially inwardly from the mounting wall 96 is an elongated peripheral wall or inner tubular housing member 98 of cyclindrical configuration which is open at its inner end and provided with a suitable interior groove for receiving an annular bead formed on a mounting portion 100 of the second housing part. As shown, the second mounting part also includes a radial wall portion 102 having an inner hub portion 104 which rotatably receives the hub portion 90 of the impeller 20 therethrough. As shown, a thrust roller bearing assembly 106 is mounted between the wall 88 of the impeller 20 and the radial wall portion 102.

Figure 3:
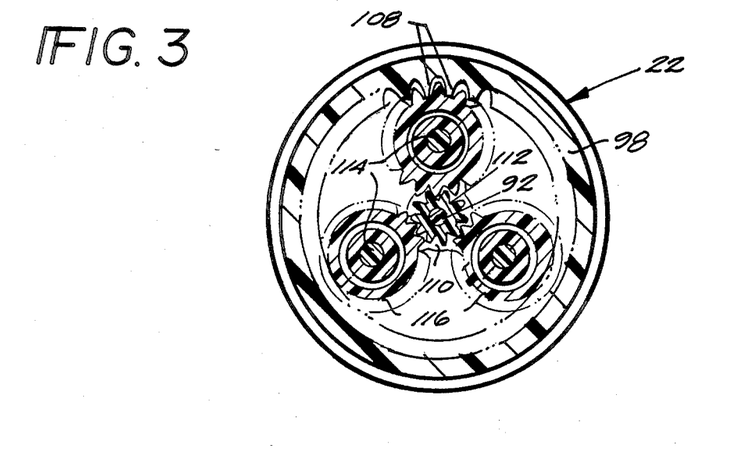
FIG. 3 is a sectional view taken along the line 3—3 of FIG. 1.

The motion transmitting mechanism 22 is preferably of the type utilizing a plurality of stacked sets of planetary gear assemblies. The inner tubualr housing member 98 has formed on the interior thereof a series of gear teeth 108 which constitute a common orbital gear for the plurality of planetary gear sets. As best shown in FIG. 3, each planetary gear set includes a gear carrier 110 formed with an axially projecting hub portion having gear teeth 112 formed exteriorly thereon which constitutes a sun gear for each planetary gear set. Each gear carrier 110 also includes three oppositely projecting annularly spaced shafts 114 which carry a series of three planetary gears 116 which mesh with the orbital gear teeth 108. The planetary gears 116 of the first set also mesh with an input sun gear 118 formed as integral teeth on the exterior periphery of an extension of the hub portion 90 of the impeller 20. The planetary gears 116 of each successive set, up to the last set, also mesh with the sun gear 112 provided by the previous set. The carrier 110 of the last set is modified to provide an axially outwardly extending hollow output shaft 120 which is journalled on the shaft 92 and sealed with respect thereto, as by an O-ring 122. The exterior of the hollow output shaft 120 is journalled within a central sleeve portion 124 of the first housing part which is made integral with the outer end of the peripheral wall 98 by a radial wall portion 126 extending therebetween. An O-ring seal 128 operatively mounted between the exterior periphery of the output shaft 120 and the inner end of the central sleeve portion 124 serves to seal the interior of the housing of the motion transmitting mechanism 22 from the atmosphere.

Figure 6:
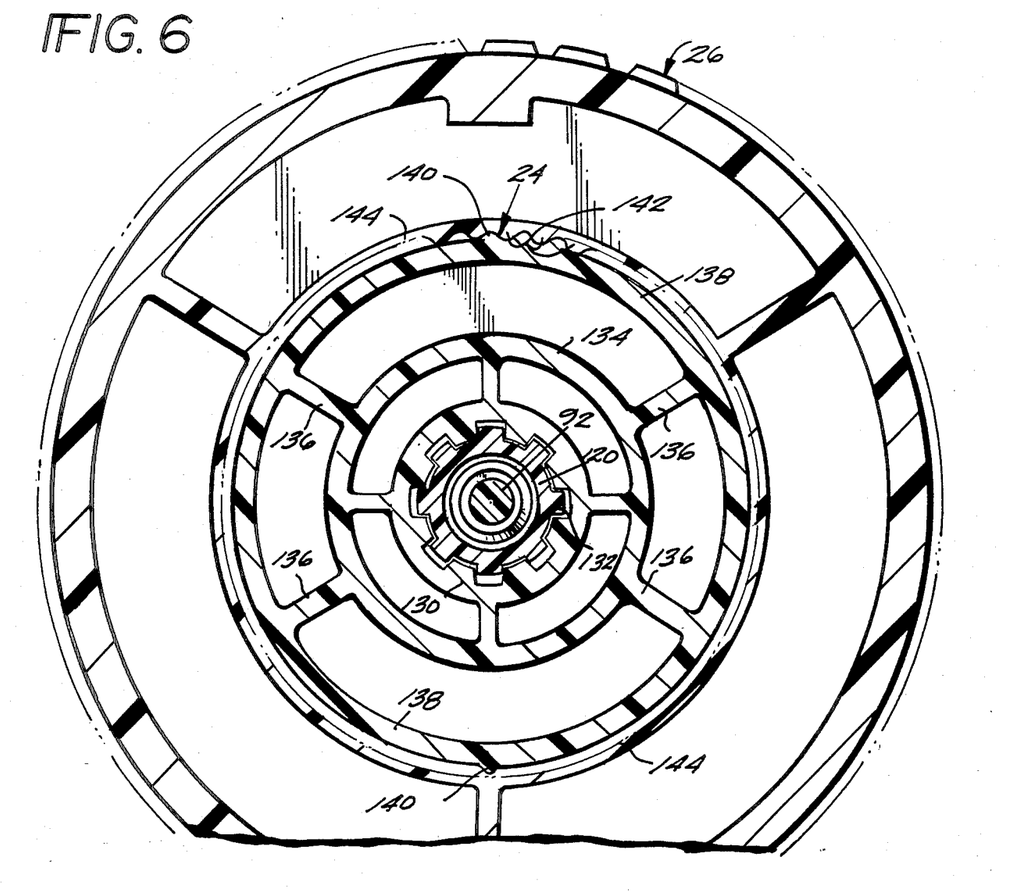
FIG. 6 is an enlarged sectional view taken along the line 6—6 of FIG. 1.

As previously indicated, the slip clutch assembly 24 serves to connect the output shaft 120 with the dial assembly 26. As best shown in FIG. 6, the slip clutch assembly 24 includes a central hub portion 130 which is suitably keyed to the exterior periphery of the outwardly extending end of the output shaft 120 by any suitable means as, for example, a spline connection 132. The slip clutch assembly 24 also includes an intermediate ring portion 134 which is integrally secured to the hub portion 130 in concentric relation therewith. Extending radially outwardly from the ring portion 136 is a series of annularly spaced ribs or spokes 136 which serve to connect the ring portion 134 to an outer annular wall 138.

As best shown in FIG. 6, diametrically opposed portions of the annular wall 138 have a substantial arcuate extent between adjacent spokes 136 so that the central sections thereof are capable of radial inward deflection. These diametrically opposed central sections have formed on the exterior periphery thereof a pair of diametrically opposed serrations 140 which are adapted to engage in frictionally releasable relation with a series of serrations 142 formed on the inner periphery of a inner cyclindrical wall portion 144 formed as a part of the dial assembly 26. As can be seen from FIG. 1, the serrations 142 provided by the dial 26 have an axial extent considerably greater than the axial extent of the pair of drive serrations 140. The interengagement of the pair of drive serrations 140 with the series of serrations 142 thus not only provides for the frictionally releasable rotational movement of the dial assembly 26 with respect to the output shaft 120 but, in addition, permits the dial assembly 26 to be axially moved with respect to the output shaft 120 in generally splined relation thereto.

The dial assembly 26 also includes an end wall 146 which is integral with the annular wall 144 and an outer peripheral wall 148 which extends forwardly from the outer end of the end wall 146. Formed on the interior periphery of the peripheral wall 148 near the free end thereof is an annular bead 150 which is of a size to snap over a bead 152 formed on an arcuate radial projection of the mounting portion 96 of the motion transmitting mechanism housing 94. The interengagement of the beads 150 and 152 serves to limit the extent of the splined movement of the dial assembly 26 axially in a direction away from the housing assembly 12.

Figure 4:
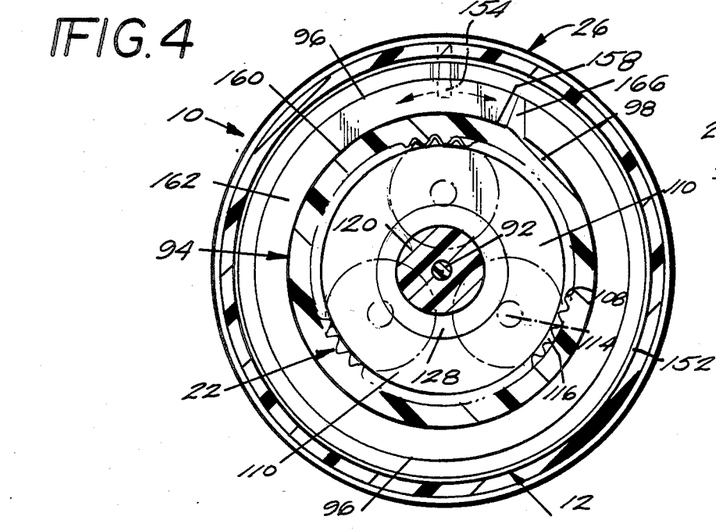
FIG. 4 is a sectional view taken along line 4—4 of FIG. 1.
Figure 5:
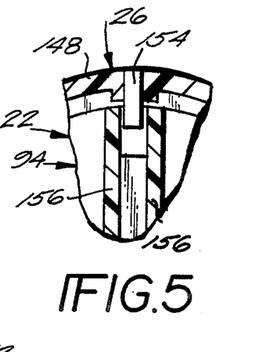
FIG. 5 is a fragmentary sectional view taken along the line 5—5 of FIG. 1.

As best shown in FIG. 5, the peripheral wall 148 of the dial assembly 26 is suitably apertured to fixedly receive a guide pin 154 which extends radially inwardly from the peripheral wall. When the dial assembly 26 is in its inoperative or water shut-off position, as shown in FIG. 1, the guide pin 154 is disposed between the outer ends of a pair of generally radially extending parallel ribs 156 formed on the wall portion 126 of the motion transmitting mechanism housing 94. As shown in both FIGS. 1 and 5, the radially outward ends of the ribs 156 serve to receive the inner end of the guide pin 154 therebetween so as to prevent rotational movement of the dial assembly 26 but to permit axial movement thereof in a direction away from the aforesaid limiting position, defined by interengaging beads 150 and 152. As shown in phantom lines in FIG. 4, this movement of the dial assembly 26 serves to dispose the guide pin 154 and the dial assembly 26 into a water flow position. In this position, the guide pin 154 is disposed within the position of communication of two annularly or arcuately extending slots 158 and 160 defined by the outer periphery of the outer end of the peripheral wall 98, an outwardly facing leg surface 162 of the mounting portion 96, and an inwardly facing surface 164 of an arcuate extension of the radial wall portion 126 extending therearound from one rib 156 to the other. As best shown in FIG. 4, the arcuate slot 158 extends from the position of communication a short arcuate distance in a clockwise direction and ends at a common abutment wall 166. Thus, the engagement of the abutment wall 166 by the pin 154 when the dial assembly 26 is manually rotated in a clockwise direction defines a limiting position of rotation of the dial in that direction. The arcuate slot 160 extends from the position of communication for a relatively long arcuate distance in a counterclockwise direction and ends at the abutment wall 166.

OPERATION

The operation of the water timer 10 will be described beginning with the parts in the position shown in FIG. 1 wherein the dial assembly 26 is in its water shut-off postion, the valve assembly 18 is disposed in its water shut-off position and the control structure 28 is also disposed in its water shut-off position. In this regard, it will be noted that the diaphragm valve 58 is engaged with seat 50 and spring 80 resiliently urges the control structure 28 to the right, as shown in FIG. 1, so that surface 78 seals off the opening 76 and extends the end of the shaft 92 into engagement with the end wall 146 of the dial assembly 26.

Assuming that the female coupling 14 is connected with a sillcock or the like providing a source of water under pressure and that the male coupling 16 is connected with a female hose coupling leading to a sprinkler or other such instrumentality, it will be noted that water under pressure from the source will enter the housing assembly 12 through the inlet opening 36 thereof and pass into the inner end of the housing 12 and through openings 54 into the space 56 in pressure responsive relation with the surface area 72 of the diaphragm valve 58. The strength of spring 80 is chosen such that the initial communication of the water pressure with the surface area 72 cannot flow past the valve seat 50 but can flow through the series of orifices 74 into the chamber 66. Flow from the chamber 66 is prevented by engagement of the control surface 78 with the opening 76 of the diaphragm valve 58. In this way, the pressure buildup within the chamber 66 acts upon the surface 75 of the diaphragm valve 58 which is greater than the surface area 72 so that the net effect of the water pressure is to provide a biasing force which retains the valve member 58 in its flow shut-off position as shown. Spring 80 also biases the control member closed which in turn has the effect of biasing the diaphragm valve into its water shut-off position.

Accordingly, in the water shut-off position of the water timer 10, shown in FIG. 1, a source of water under pressure communicated with the inlet opening 36 will flow into a communicating relation with the pressure responsive surface 72 of the diaphragm valve 58 but is not allowed to flow past the valve seat 50 or from the chamber 66 through the central opening 76. Consequently, none of the source of the water under pressure reaches the outlet opening 42.

When it is desired to communicate the source of water under pressure with the outlet opening 42, the operator has the option of operating the water timer in either one of two modes of operation. One is a time controlled mode of operation and the other is a continuous mode of operation. Since the continuous mode of operation is the simpler of the two, it will be described first with particular reference to FIGS. 1, 4 and 5. To initiate this mode of operation, the operator grasps the timer dial assembly 26 and moves the same axially in a direction toward the housing end wall 34. This has the effect of displacing the guide pin 154 in the common area of communication between slots 158 and 160. Moreover, by virtue of the engagement of the shaft 92 with the dial end wall 146, this movement serves to move the control structure inwardly against the bias of spring 80 thus spacing control surface 78 from the opening 76. Water within the chamber 66 communicates with the interior of the partition structure annular wall 48 which leads to the outer opening 42 through the guide vanes 84 and the impeller blades 86. The flow of water through the relatively large central opening 76 is greater than the combined flow which may occur through the series of restricted orifices 74 and consequently a drop in the pressure conditions acting upon the pressure responsive surface area 72 and the pressure responsive surface area 75 is created which, by virtue of the relief of the bias of spring 80 changes the biasing assembly 30 to an extend sufficient to enable the diaphragm valve 58 to moved axially in the same direction as the direction of movement of the dial assembly 26.

In this way diaphragm valve 58 is moved from its water shut-off position into a water flow position spaced from the valve seat 50 allowing the water pressure acting on the surface 72 to flow past the valve seat 50 and into the interior of the partitioned structure annular wall 48. As previously indicated, the water continues to flow radially outwardly by virtue of the guide vanes 84 and end wall 82 so as to impinge upon the impeller blades 86 causing the same to move in a counterclockwise direction as viewed in FIG. 2. Thereafter, the water can leave the outer edges of the blades 86 and flow into the annular space between the peripheral wall of the tubular housing member 32 and the peripheral wall 98 of the housing 94 of the motion transmitting mechanism 22. This space is communicated with the outlet opening 42 allowing the water to flow therethrough and into the male hose coupling 16 and then out into the hose (not shown).

The rotational movement of the impeller 20 is, by virtue of the engagement of the teeth of the sun gear 118 thereof with the planetary gears 116 which are in turn meshed with the orbital gear teeth 108 is transmitted to the carrier 110 of the first gear set. The carrier 110 of each succeeding gear set is rotated at a lesser speed by virtue of the meshing engagement with the planetary gears thereof with the sun gear 112 of the preceding gear set thus resulting in a relatively slow rotational movement of the output shaft 120 in a clockwise direction as viewed in FIG. 4.

With reference to FIG. 4, it will be noted that in addition to the axial movement imparted to the dial assembly 26 by the operator, the operator after effecting the axial movement effects a sequential arcuate or rotational movement of the dial assembly 26 in a clockwise direction, as viewed in FIG. 4. This will bring the guide pin 54, shown in phantom lines in FIG. 4, to the right into engagement with the abutment wall 166. In this position, when the operator releases the dial assembly 26 the bias of spring 80 acting through the control structure 28 and shaft 92 is imposed against the dial assembly 26 which is prevented from moving in the direction of bias by virtue of the engagement of the guide pin 154 with the wall surface 164 defining the slot 158.

As previously indicated, the operation of the impeller 20 and motion transmitting mechanism 22 will result in a clockwise movement of the output shaft as viewed in FIG. 4 and 6. This clockwise movement of the output shaft 120 carries with it the slip clutch assembly 24 by virtue of the spline connection 132. As the slip clutch assembly 24 moves with the output shaft 120, the opposed pair of drive serrations 140 releasably frictionally engage the series of serrations 142 formed in the annular wall 144 of the dial assembly 26. Since the dial assembly is prevented from further clockwise movement by virtue of the engagement of the guide pin 154 with the abutment wall 166, the pair of drive serrations 140 are resiliently biased inwardly by virtue of the resilient bias in the associated central sections of the annular wall 138 so that the timer will continue to communicate the inlet opening 36 with the outlet opening 42 continuously until manually stopped.

When the operator desires to shut-off the water in the continuous operation mode, the dial assembly 26 is again grasp by the operator and this time moved through an arcurate movement or partial rotational movement in a counterclockwise direction as viewed in FIGS. 4 and 6 until the guide pin reaches the phantom line position shown in FIG. 4. Thereafter, the operator simply allows the dial assembly 26 to be biased in an axially outward direction by the spring 80. This movement also serves to bias the control structure 28 in the same direction so that surface 78 closes the central opening 76. The bias of the spring 80 and the resultant entry of water under pressure through the orifices 74 which is prevented from passing outwardly of the chamber 66 results in the diaphragm valve 58 moving from its water flow position in the direction of movement of the dial assembly 26 into its water shut-off position wherein valve seat 50 is engaged. The biasing assembly 30 through the force imposed by spring 80 and the resultant pressure force established by virtue of the surface area 75 being larger than surface area 72 thus changes to effect the diaphragm valve movement into the water shut-off positon and to thereafter maintain it in such posiiton until such time as the biasing assembly 30 is changed again.

It will be understood that the operation of the water timer 10 in the time controlled mode is similar to the continuous flow mode except that the operator must turn the dial assembly 26 sequentially after it has been moved axially inwardly, in a counterclockwise direction as viewed in FIG. 4. In this regard, suitable indicia is placed either on the dial assembly 26 or on the peripheral wall of the housing member 32 to indicate a time interval range and incremental divisions within that range. The indicia enables the operator to determine how far to turn the dial assembly 26 in a counterclockwise direction in order to achieve the desired time of water application. It will be understood that the total extent of the counterclockwise turning movement is equal to the arcuate distance from the dotted line position of the guiding pin 154, shown in FIG. 4, until the guiding pin 154 engages the abutment wall 166. Once the operator has set the desired time by the extent of the turning movement of the dial assembly 26 in a counterclockwise direction, the operator simply releases the dial assembly and the engagement of the guide pin 154 with the surface 164 defining slot 160 prevents the dial assembly 26 from moving axially outwardly but permits turning movement in a clockwise direction as viewed in FIG. 4.

As before, once the dial assembly 26 reaches the water flow position, the flow of water under pressure from the inlet opening 36 to the outlet opening 42 takes place and the impeller 20 together with the motion transmitting mechanism 22 is driven so that the output shaft turns in a clockwise direction as viewed in FIGS. 4 and 6. The slip clutch assembly 24, which turns with the output shaft, has sufficient friction with the dial assembly 26 to effect a clockwise movement thereof with the output shaft 120. Consequently, the dial assembly 26 will be moved in a clockwise direction away from the abutment wall 166 in a direction toward the phantom line position of guide pins 154, shown in FIG. 4. When sufficient rotation has taken place to reach this condition, the dial assembly 26 is biased by the biasing assembly 30 outwardly into its water shut-off position which in turn, closes opening 76, changes biasing assembly 30 which results in the movement of the diaphragm valve 58 into its water shut-off position engagement with the annular valve seat 50.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A water timer comprising
    a housing assembly,
    a female hose coupling on said housing assembly for connection with a sillcock outlet or the like, to provide an inlet for the communication of a source of water under pressure to the interior of said housing assembly,
    an outlet on said housing assembly,
    valve means mounted within said housing assembly between said inlet and said outlet for movement between water shut off and water flow positions, a timer dial mounted on said housing assembly (1) for manual axial movement in one direction from a water shut-off position into a water flow position (2) for manual rotational movement in one direction into a selected position of rotational adjustment which corresponds with the desired water flow time (3) for rotational movement in the opposite direction and (4) for axial movement in an opposite direction back into said water shut-off position, an impeller within said housing assembly mounted to be rotated by impingement of water flowing between said inlet and outlet when said valve means is in said water flow position, a speed reducing motion transmitting mechanism between said impeller and said dial for slowly imparting a rotational movement in said opposite direction to said dial in response to the rotational movement of said impeller after said dial has been manually axially moved into said water flow position and rotated in said one rotational direction into a selected position, said valve means including a valve seat in said housing assembly and a valve member movable in one direction, corresponding with the one direction of axial movement of said dial, into a water flow position out of engagement with said valve seat and movable in an opposite direction, corresponding with the opposite direction of axial movement of said dial, into engagement with said valve seat into a water shut-off position, said valve member having a first pressure responsive surface area facing in said opposite direction disposed in communication with water under pressure communicating with said inlet and a second pressure responsive surface area facing in said one direction, means defining a controllable water pressure chamber within said housing assembly communicating with said second surface area, first passage means for communicating water under pressure communicating with said first surface area when said valve member is in its water shut-off position with said controllable chamber, means including the relative sizes of said first and second pressure responsive surface areas for biasing said valve member into its water shut-off position when said dial is in its water shut-off position and a source of water under pressure is communicated with said inlet, and means operable in response to the axial movement of said dial in said one direction into said water flow position for communicating said chamber with said outlet thereby changing said biasing means to an extent sufficient to cause the same to bias said valve member from its water shut-off to its water flow position.

2. A water timer as defined in claim 1 wherein said valve seat comprises an annular surface facing generally in said one direction.

3. A water timer as defined in claim 2 wherein said housing assembly includes an inner annular wall extending in said opposite direction from said annular valve seat surface and a concentric generally coextensive apertured outer annular wall defining therewith an annular water flow space extending in communicating relation with said inlet and with the first pressure responsive surface of said valve member.

4. A water timer as defined in claim 3 wherein said valve member comprises an annular valve diaphragm fixed at its outer periphery with respect to said outer annular wall, said first pressure responsive surface area comprising an annular area defined exteriorly by the fixed peripheral connection between said valve diaphragm and said outer annular wall and interiorly by an intermediate annular portion adapted to engage said annular valve seat surface.

5. A water timer as defined in claim 4 wherein said first passage means comprises restricted openings extending through said valve diaphragm at the annular surface thereof.

6. A water timer as defined in claim 5 wherein said housing assembly includes a fixed water directing member having surface means for receiving the water flow axially through said inner annular wall in said opposite direction and directing the same outwardly in turning relation with respect to said impeller.

7. A water timer as defined in claim 6 wherein said motion transmitting mechanism includes a series of planetary gear sets mounted in axially stacked relation within said housing assembly.

8. A water timer as defined in claim 7 wherein said chamber communicating means comprises a shaft, said biasing means including a coil spring operatively connected with said shaft for resiliently biasing the same in said opposite direction into a water shut-off position, said shaft being movable in said opposite direction against the bias of said coil spring out of said water shut-off position into a water flow position.

9. A water timer as defined in claim 8 wherein said valve diaphragm includes a central aperture extending therethrough, the adjacent end portion of said shaft extending in said one direction through said central aperture, and an enlarged end on said shaft for engaging and closing said aperture when said shaft is in its flow shut-off position.

10. A water timer as defined in claim 9 wherein said shaft forms the means for rotationally supporting said impeller and said planetary gear sets.

11. A water timer as defined in claim 10 wherein said dial is also mounted (5) for manual rotational movement in said opposite direction into a limiting position and (6) for manual rotational movement in said one direction away from said limiting position, and slip clutch means between said motion transmitting mechanism and said dial for slipping so that said motion transmitting mechanism will not impart a rotational movement in said opposite direction to said dial when said dial has been manually axially moved into said water flow position and rotated in said opposite direction into said limiting position.

12. A water timer as defined in claim 11 wherein said slip clutch means includes an annular member fixed to said timer dial and having a serrated interior periphery, a clutch member fixed to an output shaft of said motion transmission mechanism, said clutch member including a plurality of exterior serrations mounted for resilient inward deflection for engaging and resistingly slipping past the serrated interior periphery of said annular member with a clicking noise.

13. A water timer as defined in claim 12 wherein said housing assembly includes an outer tubular housing member, an inner tubular housing member mounted within said outer housing member, a common end member closing both of said tubular housing members at one end thereof, the output shaft of said motion transmission mechanism being journalled in and extending through said common end member, said timer dial including an end wall and a peripheral wall extending from said end wall over the one end of said outer housing member, said peripheral wall having a pin extending radially inwardly therefrom, said end member including an axial pin receiving slot, a relatively long arcuate segmental pin receiving slot extending from said axial slot in said one direction and a relatively short arcuate segmental pin receiving slot extending from said axial slot in said opposite direction and a common stop wall between said arcuate slots.

14. A water timer as defined in claim 1 wherein said motion transmitting assembly includes a series of planetary gear sets mounted in axially stacked relation within said housing assembly.

15. A water timer as defined in claim 14 wherein said chamber communicating means comprises a shaft, said biasing means including a coil spring operatively connected with said shaft for resiliently biasing the same in said opposite direction into a water shut-off position, said shaft being movable in said opposite direction against the bias of said coil spring out of said water shut-off position into a water flow position.

16. A water timer as defined in claim 15 wherein said shaft forms the means for rotationally supporting said impeller and said planetary gearsets.

17. A water timer as defined in claim 1 wherein said dial is also mounted (5) for manual rotational movement in said opposite direction into a limiting position and (6) for manual rotational movement in said one direction away from said limiting position, and slip clutch means between said motion transmitting mechanism and said dial for slipping so that said motion transmitting mechanism will not impart a rotational movement in said opposite direction to said dial when said dial has been manually axially moved into said water flow position and rotated in said opposite direction into said limiting position.

18. A water timer as defined in claim 17 wherein said slip clutch means includes an annular member fixed to said timer dial and having a serrated interior periphery, a clutch member fixed to an output shaft of said motion transmission mechanism, said clutch member including a plurality of exterior serrations mounted for resilient inward deflection for engaging and resistingly slipping past the serrated interior periphery of said annular member with a clicking noise.

19. A water timer as defined in claim 1 wherein said housing assembly includes an outer tubular housing member, an inner tubular housing member mounted within said outer housing member, a common end member closing both of said tubular housing members at one end thereof, the output shaft of said motion transmission mechanism being journalled in and extending through said common end member, said timer dial including an end wall and a peripheral wall extending from said end wall over the one end of said outer housing member, said peripheral wall having a pin extending radially inwardly therefrom, said end member including an axial pin receiving slot, a relatively long arcuate segmental pin receiving slot extending from said axial slot in said one direction and a relatively short arcuate segmental pin receiving slot extending from said axial slot in said opposite direction and a common stop wall between said arcuate slots.

20. A water timer comprising
a housing assembly,
a female hose coupling on said housing assembly for connection with a sillcock outlet or the like, to provide an inlet for the communication of a source of water under pressure to the interior of said housing assembly,
an outlet on said housing assembly,
valve means mounted within said housing assembly between said inlet and said outlet for movement between water shut off and water flow positions,
a timer dial mounted on said housing assembly (1) for manual axial movement in one direction from a water shut-off position into a water flow position (2) for manual rotational movement in one direction into a selected position of rotational adjustment which corresponds with the desired water flow time (3) for rotational movement in the opposite direction and (4) for axial movement in an opposite direction back into said water shut-off position,
an impeller within said housing assembly mounted to be rotated by impingement of water flowing between said inlet and outlet when said valve means is in said water flow position,
a speed reducing motion transmitting mechanism between said impeller and said dial for slowly imparting a rotational movement in said opposite direction to said dial in response to the rotational movement of said impeller after said dial has been manually axially moved into said water flow position and rotated in said one rotational direction into a selected position,
said valve means including a valve seat in said housing assembly and a valve member movable out of engagement with said valve seat into a water flow position and into engagement with said valve seat into a water shut-off position,
said valve member having a first pressure responsive surface area disposed in communication with water under pressure communicating with said inlet and a second pressure responsive surface area facing in a direction opposed to the direction said first surface area faces,
means defining a controllable water pressure chamber within said housing assembly communicating with said second surface area,
first passage means for communicating water under pressure communicating with said first surface area when said valve member is in its water shut-off position with said controllable chamber,
means including the relative sizes of said first and second pressure responsive surface areas for biasing said valve member into its water shut-off position when said dial is in its water shut-off position and a source of water under pressure is communicated with said inlet,
second passage means disposed in communicating relation between said chamber and said outlet,
control means mounted in cooperating relation with said second passage means for movement in said one axial direction and in said opposite axial direction between two limiting positions,
and means operable in response to the axial movement of said dial in said one direction into said water flow position for moving said control means from one of said two limiting positions wherein said control means prevents said second passage means from communicating said chamber with said outlet into the other of said two limiting positions wherein said control means enables said second passage means to communicate said chamber with said outlet thereby changing said biasing means to an extent sufficient to cause the same to bias said valve member from its water shut-off position into its water flow position.

* * * * *